(No Model.)

G. E. WOODBURY.
APRON FOR ORE CONCENTRATING MACHINES.

No. 381,456. Patented Apr. 17, 1888.

Witnesses:
Wm Mayer
John L. Taggard

Inventor:
George E. Woodbury.
By his atty.

UNITED STATES PATENT OFFICE.

GEORGE E. WOODBURY, OF SAN FRANCISCO, CALIFORNIA.

APRON FOR ORE-CONCENTRATING MACHINES.

SPECIFICATION forming part of Letters Patent No. 381,456, dated April 17, 1888.

Application filed February 4, 1886. Renewed April 13, 1887. Serial No. 234,644. (No model.)

*To all whom it may concern:*

Be it known that I, GEORGE E. WOODBURY, a citizen of the United States, residing in the city and county of San Francisco, in the State of California, have invented certain new and useful Improvements in Aprons for Ore-Concentrating Machines; and I do hereby declare that the following is a full, clear, and exact description of my invention, reference being had to the accompanying drawings.

My invention relates to improvements in aprons which are provided with raised edges and used in ore-concentrating machines. The raised sides or margins of such surfaces serve to confine the pulp and water thereon while the apron is traveling through the machine under the motions of progression and vibration that are imparted to it. In the manufacture of such aprons it has heretofore been the practice to form the raised edges either by cementing strips of rubber upon the face of the apron along the edges or by molding the edges with the body of the apron in a suitable mold under heat and pressure.

My invention consists of a concentrating belt or apron for ore-concentrators produced from several layers of suitable material, the upper layer being detached along its edges and having elastic wedge-shaped pieces inserted under said edges.

The accompanying drawings illustrate what I consider the best means for carrying my invention into practice, and are referred to by figures and letters.

Figure 1:
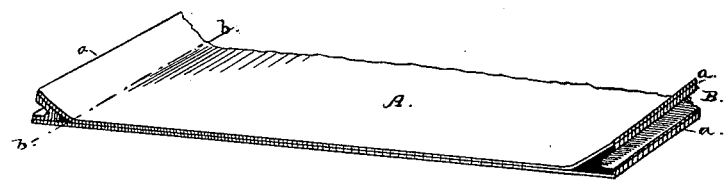
Figure 2:
Figure 3:
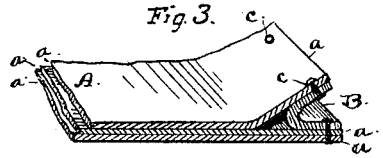
Figure 5:
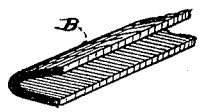
Figure 4:
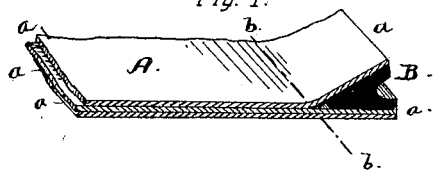
Figure 6:
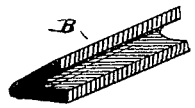

Figure 1 is a perspective view of a portion of an apron constructed according to my invention. Fig. 2 is a sectional view showing the manner in which the apron passes around a roller. Figs. 3 and 4 are enlarged views showing the construction of the edges in detail, and Figs. 5 and 6 are views of the wedge-shaped blocks.

The number of layers, $a\ a$, of rubber cloth to be used will be governed by the thickness required for the finished apron. In the construction herein shown and described I have used three thicknesses, such as is commonly employed at the present time for such aprons. These layers are united one to another by means of cement through the middle and principal portion of the body, but leaving the uppermost thickness of cloth unattached to the one beneath it all along the edges of the apron and for a distance within the edges, as shown at $a\ b$, Fig. 1. The layers are united in such manner that the union of the top layer to the one next below terminates at and along a line, $b\ b$, parallel with each edge. The middle and bottom layers, where more than two layers are used, are united together at their extreme edges, as seen in Figs. 3 and 4. The separated portion is raised up on each edge and made to stand at an angle to the top surface of the belt, and a strip or block, B, either of rubber previously formed of required shape or a strip of some other suitable flexible material, as rubber cloth, is fixed in the space between the top and bottom thicknesses. This piece B is sufficiently stiff to hold the edge $a$ at the required angle to the body A of the apron, and is also sufficiently flexible or elastic to permit the edge to yield and accommodate itself to the surfaces over which the apron is compelled to travel—such, for instance, as the drums or rollers.

In the construction where the piece B is formed of a block of rubber it is made wedge-shaped, with a groove or hollow along the thicker end that is placed outward. As these grooves are desired to reduce the stiffness of the apron along the outer edges, they are carried into the blocks a greater or less distance, according to the degree of flexibility desired. Another way in which these pieces B may be formed is by bending strips, as B, Fig. 5, over upon themselves through the middle and securing them in place between the edge portions of the apron either by cementing the surfaces or by using rivets $c$, or by employing both cement and rivets, as circumstances may require. The solid piece B, Fig. 6, may be secured in the same way.

Aprons with raised edges formed in this manner will be found to possess great flexibility, strength, and durability.

Having thus fully described my invention, what I claim, and desire to secure by Letters Patent, is—

An apron for ore-concentrators, formed of layers of material of the character described and having the upper layer separate from the layer or layers beneath it at and along its edges, and elastic wedge-shaped pieces B, fixed in the spaces between the edges of said layers and adapted by their form to support the detached portions of the upper layer at an angle to the upper face of the belt, and by their elasticity to allow the edges to bend or yield in traveling over the rollers.

Witness my hand.

GEORGE E. WOODBURY.

Witnesses:
EDWARD E. OSBORN,
JOHN L. TAGGARD.